United States Patent

[11] 3,573,614

| [72] | Inventor | Donald R. Wittbrodt<br>Warren, Mich. |
|---|---|---|
| [21] | Appl. No. | 724,350 |
| [22] | Filed | Apr. 26, 1968 |
| [45] | Patented | Apr. 6, 1971 |
| [73] | Assignee | the United States of America as represented by the Secretary of the Army |

[54] TRANSIENT VOLTAGE INDICATING, MEASURING, AND COUNTING CIRCUIT
15 Claims, 4 Drawing Figs.

[52] U.S. Cl. .................................................. 324/102,
324/133, 340/248
[51] Int. Cl. .................................................. G01r 19/00,
G01r 19/14
[50] Field of Search .................................................. 324/102,
103, 99, 133; 331/111; 307/318; 328/116;
340/172, 248 (C)

[56] References Cited
UNITED STATES PATENTS

| 2,972,126 | 2/1961 | Hecox et al. | 324/102X |
|---|---|---|---|
| 3,173,107 | 3/1965 | Scharf et al. | 331/111 |
| 3,303,389 | 2/1967 | Jones et al. | 307/318X |
| 3,303,493 | 2/1967 | Charbonnier | 324/99X |
| 1,744,840 | 1/1930 | Strieby et al. | 324/133X |
| 2,752,589 | 6/1956 | de Long, Jr. | 324/103X |
| 2,810,828 | 10/1957 | Gray et al. | 324/103X |
| 3,334,341 | 8/1967 | Green | 340/248 |
| 3,440,537 | 4/1969 | Warner et al. | 324/99X |

*Primary Examiner*—Rudolph V. Rolinec
*Assistant Examiner*—Ernest F. Karlsen
*Attorneys*—Edward J. Kelly, Harry M. Saragovitz, Herbert Berl and John J. Swartz

ABSTRACT: A circuit for indicating, measuring, and counting transient voltage signal characteristics present in a power supply system including means for sensing the transient signal of a predetermined magnitude, control circuit means for generating first, second and third output signals in response to the transient signals, indicator means responsive to said first and second signals for indicating the presence of said transient signal, means responsive to said third signal for measuring the width of said transient and means responsive to said third signal for measuring the duration of said transient voltage signals.

DONALD R. WITTBRODT
INVENTOR

DONALD W. WITTBRODT
INVENTOR

BY H. M. Saragovitz
E. J. Kelly
H. Berl
and J. J. Swartz
ATTORNEYS

TRANSIENT VOLTAGE INDICATING, MEASURING, AND COUNTING CIRCUIT

The invention described herein may be manufactured, used, and licensed by or for the Government for governmental purposes without payment to me of any royalty thereon.

This invention relates to a circuit for indicating, measuring, and counting transient voltage signal characteristics present in a power supply system. More particularly, this invention relates to a transient voltage discriminator indicator for indicating the presence of transient voltage signals in a power supply system.

Power supply systems are commonly used in almost every type of electrical and electronic equipment available. It has been found that due to a myriad of problems, transient voltage signals are present in an otherwise normally steady state DC output voltage. In some cases, equipment is not affected by these transient fluctuations in the output signal. In other cases, however, these transient voltage signals have been found to be untenable. If the transient voltage signal is sufficiently high, it may permanently damage various electronic devices. These transient signals may also cause electronic equipment to indicate erroneous readings or otherwise cause interference with the equipment. Moreover, these transient signals have been known to render equipment inoperable due to the burning of a protective fuse in the equipment. As can be seen, the presence of these transient signals is unacceptable in many pieces of equipment and their presence must be immediately detected. Once the transient signals are detected, they can be easily eliminated, particularly if their quantity, magnitude, and width are known. The means by which this is accomplished is the subject matter of this invention.

Prior art devices utilized to accomplish this have included a transient voltage detector which utilizes a capacitor in which is charged through a diode when a transient voltage appears in the supply circuit. The capacitor circuit is connected to an indicator which has a referenced diode connected in parallel with the indicator. The capacitor circuit is also connected with a plurality of parallel networks each consisting of a very low current fuse in series with a reference diode. When the capacitor discharges, current flows through the indicator and also through the parallel network circuit. A reference diode in the parallel network sets the minimum voltage level for it and the presence of a transient voltage is indicated by a burned fuse. This prior art system has many disadvantages including the replacement of the burned fuses in the event of a transient voltage. Moreover, if the fuse is blown, repeated transient voltages cannot be measured without replacement of the fuse. Another limitation of this prior art system is its inability to provide any indication of the quantity of transient voltage signals on the in output circuit.

Accordingly, it is an object of the present invention to eliminate the aforementioned disadvantages.

Another object of the present invention is to provide a circuit for indicating transient voltage signal characteristics present in an electrical power supply.

It is still another object of the present invention to measure transient voltage signal characteristics in electrical power supply source.

It is still another object of the present invention to provide a circuit for counting the quantity of transient voltage signals present in electrical power supply.

It is yet another object of the present invention to provide a circuit which will indicate, count, and measure the width of transient voltage signals by electronic methods.

A further object of the present invention is to provide a discriminator and indicator circuit for indicating the presence of transient voltage signals in a power supply output circuit.

According to the present invention, therefore, there is provided a circuit for measuring, indicating, and counting the transient voltage signal characteristics present in a power supply output circuit including discriminator circuit means for detecting the presence of transient voltage signals which are of a predetermined magnitude and providing a plurality of control signals responsive thereto. Indicator circuit means are connected to the discriminator and are responsive to the output signals therefrom to provide both a temporary and permanent indication of the presence of a transient voltage signal. Also connected to the discriminator is an electronic counter means for determining the quantity of transient voltage signals present in the supply circuit. Circuit means for measuring the width of the transient voltage is also connected to the discriminator and may be used separately or in combination with the electronic counter means.

Other objects and advantages of the present invention will become apparent to those of ordinary skill in the art by the following description when considered in relation to the accompanying drawing of which:

Figure 1:
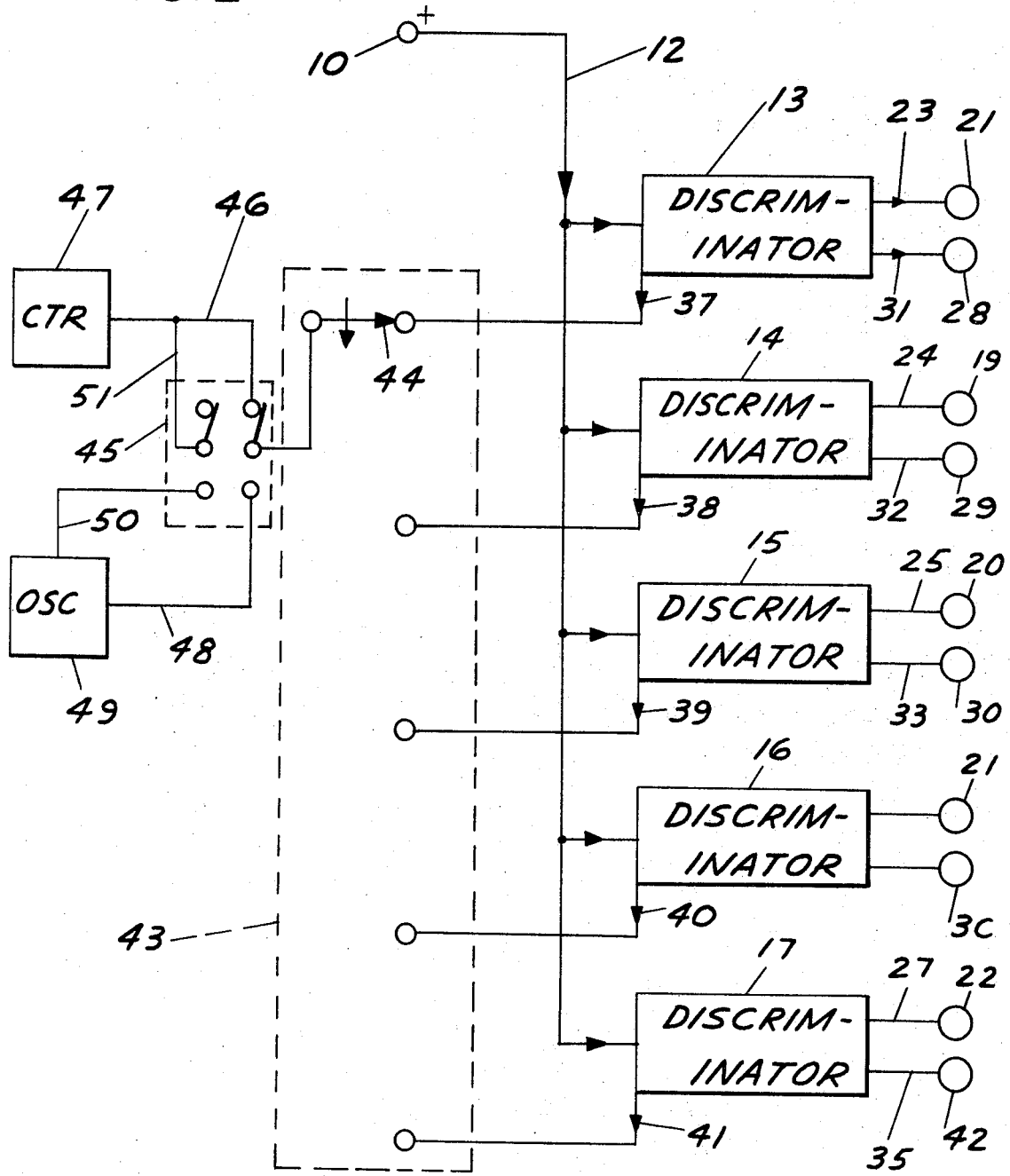
FIG. 1 is a block diagram of the circuit according to the invention utilizing the preferred embodiment of the counting and measuring portion of the circuit.

Referring now to the drawing wherein similar numerals will be referred to similar parts in the various FIGS., a DC power source is shown at 10 connected to a DC supply output circuit 12. Connected to the output circuit 12 are a plurality of discriminators 13 through 17, shown in diagrammatic form. Each of the discriminators is set to respond to a different predetermined transient voltage. For example, discriminator 13 may respond to a peak voltage of 40 volts, discriminator 14 will detect a transient voltage peak of 50 volts, discriminator 15 may be set to a signal of 70 volts, and discriminator 16 and 17 set to respond to a transient signal of 90 and 120 volts respectively. When a transient signal occurs which exceeds the predetermined level for a particular discriminator, each discriminator so affected, through circuit means which will be described hereinafter, provides first and second output signals. If, for example, a 120-volt signal was present in output circuit 12, the predetermined voltage of each discriminator 13—17 would be exceeded and hence would produce a first output signal shown at 23—27 and a second output signal shown at 31—35, respectively.

Indicator circuit means are connected with the discriminator and is responsive to said first and second output signals. The indicator circuit means comprises first and second indicator connected with each of the discriminators. As can be seen in FIG. 1, first indicator means 18—22 are provided with each of the discriminators 13—17 and responsive to the first output signal 23—27, respectively. Similarly a second indicator circuit means 28—30, 36, and 42 are connected to each of the discriminators 13—17 and responsive to the second output signal 31—35, respectively. As will be described hereinafter, the first indicator means provides a temporary signal indicating the presence of a voltage transient signal whereas the second indicator means provides a permanent indication of the presence of a transient voltage signal which can be selectively removed.

As can be seen in FIG. 1, each discriminator 13—17 provides a third output signal showing at 37—41. The particularly manner in which this signal is derived will be described more fully herein.

The third output signal from each discriminator is supplied to switch means shown generally at 43 with switch arm 44 which can selectively connect the output from each of the discriminators to the remainder of the circuit. The switch arm 44 may be controlled in any suitable electrical or mechanical manner such as by a relay coil or by means of a hand-operated switch. As shown in the drawings, switch arm 44 is connected to another double pole double throw switch shown generally at 45. With the switch in the position shown in the drawing, current flow through switch 44 will be supplied to counter 47 by means of conductor 46. Counter 47 is an electronic counter means and may be one of any suitably available commercial model; for example, Hewlett Packard Electronic Counter, Model 522B or equivalent. These electronic counters conventionally utilize multivibrator networks to count electronic pulses in a manner well-known in the art.

With the double pole double throw switch 45 in the position opposite to that shown in the drawing, a signal appearing at switch arm 44 will flow through conductor 48 to oscillator 49. In response to this signal, oscillator 49 will provide a series of electrical pulses along conductor 50 through switch 45 to conductor 51 and then to counter 47. Hence, in the embodiment shown in FIG. 1 electronic counter 47 can be used alternately to count either the number or width of transient signals. When the counter 47 is connected directly to switch arm 44, of the counter will be indicating the quantity of transient voltage pulses appearing in the output supply circuit 12. When the switch arm 45 is in the opposite position, oscillator 49 will produce a series of pulses proportional to the length of time the transient voltage appears in the output circuit 12 and hence the counter will indicate the width of the transient signal voltage.

Figure 2:
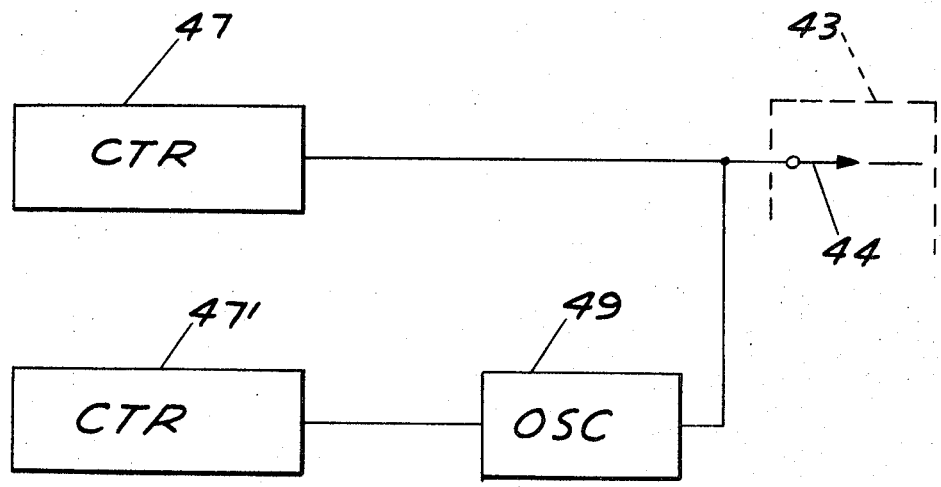
FIG. 2 is a block diagram showing an alternate embodiment of the counting and measuring portion of the circuit according to the invention.

Referring now to FIG. 2 an alternate mode of measuring and counting the quantity and width of the transient voltage signal is shown. Instead of being fed through a switch, the signal appearing at switch arm 44 will be connected directly to electronic counter 47 and also directly connected to oscillator 49. In this embodiment, both the quantity and width of the transient voltage signal may be simultaneously measured. Counter 47 will be utilized solely to measure the quantity of signals appearing at switch arm 44 in a manner similar to that described in relation to FIG. 1. This signal however, will simultaneously cause oscillator 49 to produce a series of pulses proportional to the length of the time that the signal appears at switch arm 44. By a suitable selection of parameters, the pulse rate of oscillator 49 can be predetermined. Hence for a given number of pulses generated by oscillator 49, the time in which the transient voltage signal is present in output circuit 12 can be readily determined by counter 47' which is connected to and counts the pulses generated by oscillator 49.

Figure 3:
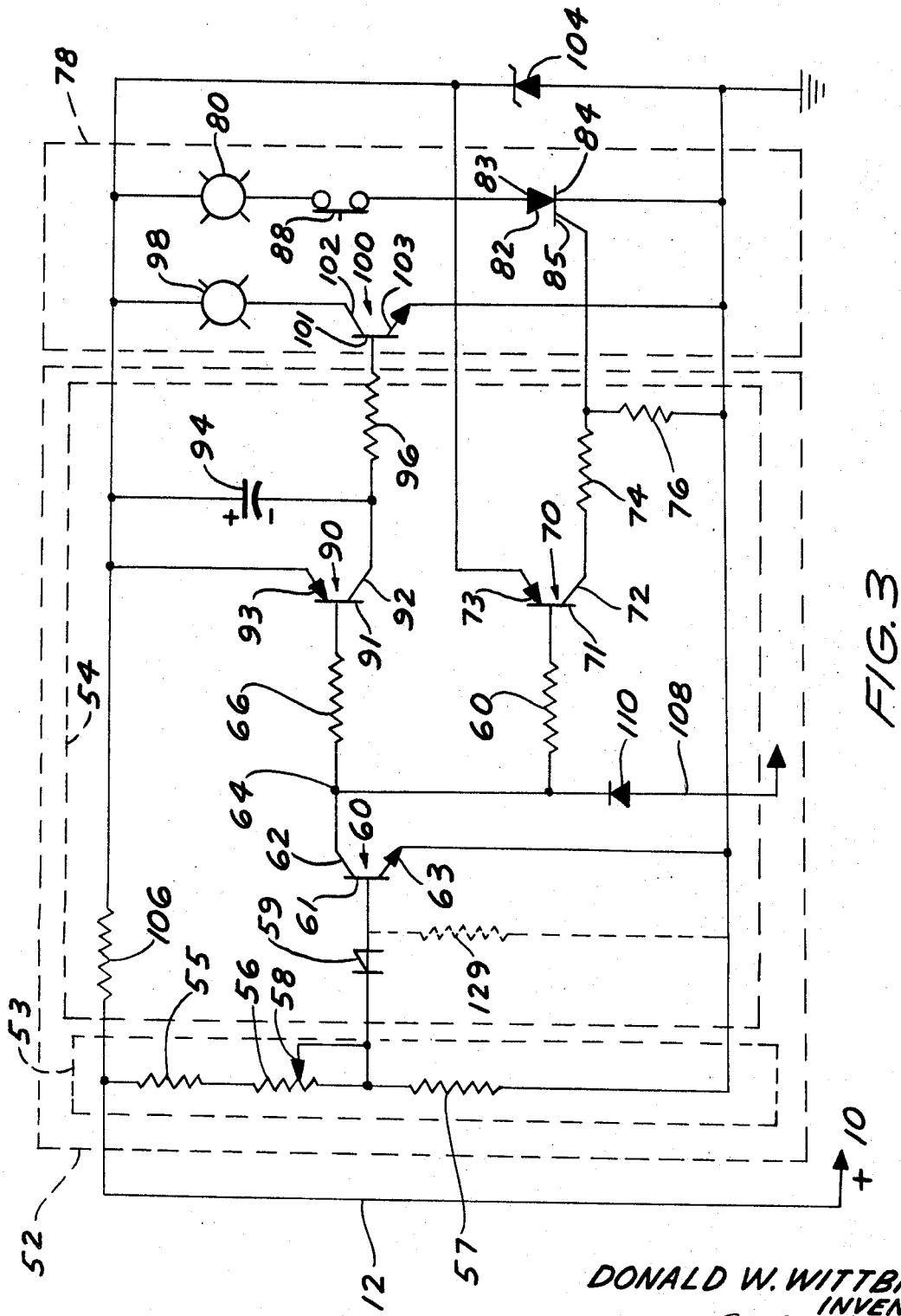
FIG. 3 is a schematic diagram of the transient voltage discriminator and indicator circuit according to the invention.

Referring now to FIG. 3, the transient voltage discriminator is shown generally in the dotted outline 52 whereas the indicator means is shown generally in the dotted outline 78. Discriminator 52 comprises voltage sensing means shown generally at 53 and control circuit means generally shown in dotted outline 54. Voltage sensing means 53 is connected to the DC output supply circuit 12 by means of resistor 55. Also inserted in series with this resistor is a potentiometer 56 having a movable arm 58 and resistor 57. Arm 58 can be moved along resistor 56 in order to obtain the voltage desired for operation of the remainder of the circuit. The three resistors 55, 56, and 57 serve as a voltage divider for providing the predetermined voltage requirements for the remainder of the circuit. Connected with the sensing circuit 53 is a breakdown diode 59 which will not conduct current until a predetermined breakdown voltage is exceeded. Although a Zener diode may be utilized, the preferred embodiment utilizes a trigger or avalanche diode. In the trigger or avalanche diode, the voltage appearing across the diode will be less after breakdown than before breakdown. This will have the advantage of more quickly saturating the attending transistors and thus perform faster switching action.

Control circuit means 54 also includes an NPN transistor 60 having a base electrode 61 connected to avalanche diode 59, emitter 63 connected to ground potential, and collector electrode 62 connected to point 64. Connected to point 64 by means of resistor 68 is base electrode 71 of transistor 70. The emitter 73 is connected to output supply circuit 10 through voltage dropping resistor 106. The collector 72 of transistor 70 is connected to ground potential through resistors 74 and 76 and provides the gating potential for silicon controlled rectifier (SCR) 82. Transistor 70 will remain nonconductive until transistor 60 becomes conductive in response to breakdown of avalanche diode 59. Current flow through the emitter collector of transistor 70 will provide a gating signal to gate electrode 85 of SCR 82, thereby permitting it to conduct through its anode 83 and cathode 84.

Silicon controlled rectifier 82 is considered a portion of the indicator circuit means 78. Indicator circuit means 78 includes a first indicator shown schematically at 80 connected to the output supply circuit 10 through voltage dropping resistor 106. Indicator 80 may conveniently be a lamp, however, any other suitable electronic means may be utilized such as a relay. When gating potential is applied to SCR 82, current flows through indicator 80 from source 10, thereby indicating the presence of a transient voltage signal. Indicator 80 will continue to receive current and will continue to indicate the presence of a transient signal until such time as reset switch 88 is opened, thereby interrupting the current flow thereto. If desired, of course, a Triggister could be utilized in place of the SCR in conjunction with suitable pulsing circuit means which would enable the Triggister to be turned off, thereby eliminating the need for reset switch 88.

Also connected to point 64 by means of resistor 66 is the base electrode 91 of transistor 90. Emitter electrode 93 is connected to the output circuit means through resistor 106. A capacitor 94 is shown connected across the emitter 93 and collector 92. The junction of the capacitor 94 and collector 92 is connected to the base 101 of transistor 100 by means of resistor 96. Similar to transistor 70, transistor 90 will conduct when transistor 60 is conducting, thereby dropping the potential of point 64 sufficient to enable saturation of transistor 90. When transistor 90 is rendered conductive, the capacitor 94 will momentarily discharge through the emitter collector path of transistor 90.

The emitter 103 of transistor 100 is connected to ground potential, whereas the collector 102 is connected to second indicator means 98. As will be described more fully hereinafter, indicator 98 provides a temporary indication of the presence of the transient voltage signals. Indicator 98 may conveniently be a flashing indicator that flashes once upon each occurrence of an input transient voltage, hence, upon the occurrence of a series of transient voltage signals, indicator 98 will provide a continuous flashing indication of the repeated transient signals whereas indicator 80 will provide only one permanent indication.

Connected in parallel circuit relation with indicator circuit means 78 is a Zener diode 104 to protect the indicator means against excessive voltage. In a 28-volt power supply system, for example, the breakdown potential of Zener diode 104 may conveniently be 12 volts.

To provide a third output signal from the discriminator, conductor means 108 is connected through diode 110 to point 64. As shown in FIG. 1, this signal is indicated by reference numerals 37—41. With the turn on of transistor 60, the potential drop at point 64 will be reflected through switch 43 and counted by counter 47. If the measuring and counting circuit according to FIG. 2 is utilized, this potential drop will also be reflected through switch 44 into oscillator 49, whereby a series of electrical pulses will be generated which will be counted by oscillator 47'. The oscillator 49 will be calibrated and the number of volts is indicated at counter 47' will give a quick indication of the width of the transient voltage signal.

Figure 4:
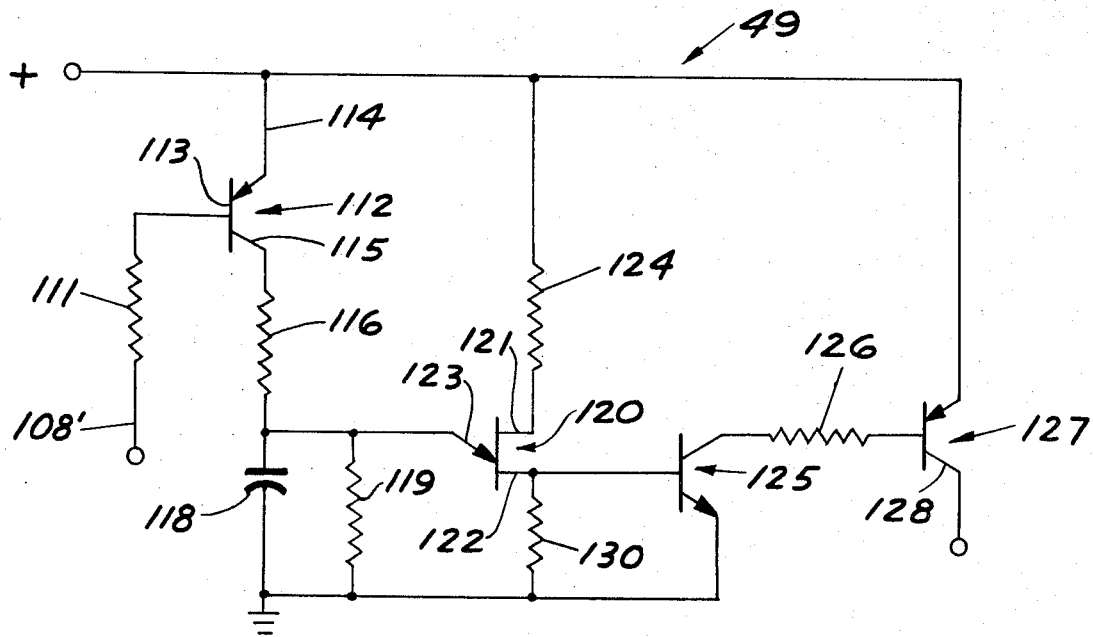
FIG. 4 is a detailed schematic of the pulse forming means shown in FIG. 1.

The details of oscillator 49 which is utilized to generate the series of electrical pulses is shown in FIG. 4. The third voltage signal appearing at point 64 in FIG. 2 is transmitted along conductor 108 to conductor means 108' of FIG. 4. This signal is transmitted through resistor 111 to the base 113 of PNP of transistor 112. The emitter 114 is connected to a DC power source whereas the collector 115 is connected to a charging capacitor 118 through charging resistor 116. When the potential across capacitor 118 exceeds the breakdown potential unijunction transistor 120, capacitor 118 will discharge through emitter 123 and resistor 130. Current will then flow through the resistor 124 and the double base circuit 121 and 122, whereby transistors 125 and 127 will be biased into conduction. When transistor 127 conducts, a pulse will be transmitted along conductor 128 to the counter 47 as shown in FIG. 1 or 47' as shown in FIG. 2.

If required, a leakage resistor 129 may be connected across the base emitter electrodes of transistor 60, as shown in FIG. 3. Depending on the amplification factor of transistor 60, a small leakage current through diode 59 may be sufficient to turn on transistor 60. By inserting resistor 129, this leakage current will be bled off, hence preventing the inadvertent turn-on. Resistor 129 should be chosen to have a very small voltage drop thereacross, however, its specific value will depend upon the other parameters in the circuit.

In operation, the power supply system will be assumed to have a steady state voltage which, for example, could be 28 volts. Both SCR 82 and transistor 100 will be assumed to be nonconductive, hence both indicators 80 and 98 will not be receiving current. When power source 10 is initially connected to output circuit 12, it should be noted that capacitor 94 will receive an initial charge through resistor 96 and the base emitter path 101 and 103. During this short charging period, indicator 98 will conduct current.

Current will also flow through voltage divider network 53. When a transient voltage signal appears in output circuit 12 sufficient to cause the voltage across trigger diode 59 to exceed its breakdown potential, transistor 60 will saturate through the emitter base electrode of transistors 90 and 70. As soon as the breakdown potential occurs, point 64 will drop to near ground potential. When transistor 70 conducts, a gating signal is provided to gate electrode 85, and SCR 82 turns on, hence permitting the flow of current through indicator 80. This indicator will remain on until such time as the reset switch 88 is opened. Hence, although repeated transient signals may appear in the output supply circuit 12, indicator 80 will provide but one indication for the entire series of transient signals. If, of course, switch 88 is opened and closed to interrupt the flow of current and reset the circuit, prior to the occurrence of the next transient signal, then individual transient signals can be detected at indicator 80. If the transient signals are narrowly separated, however, indicator 80 will not provide individual indications for the individual transient signals. This indicator will provide a permanent indication of the presence of a transient signal. This is particularly important in situations where an operator cannot be attending the circuit at all times and must have some means to quickly determine whether or not a transient signal was present.

At the same time that transistor 70 becomes conductive, transistor 90 is forward biased into conduction discharging charged capacitor 94 through the emitter collector path of transistor 90. Capacitor 94 will then begin to recharge through resistor 96 and the base 101 and the emitter 103 thereby saturating transistor 100. During the charge time of capacitor 94, indicator 98 will conduct current until capacitor 94 approaches full charge at which time transistor 100 will come out of saturation and indicator 98 will no longer receive current. Assuming indicator 98 to be a lamp, the length of time that indicator lamp 98 will emanate light for the occurrence of each transient signal will depend upon the values of capacitor 94 and resistor 96. The indicator lamp 98 must necessarily be on for a longer time than the width of the transient voltage signal in order to be visible by the naked eye. If it is desired to leave indicator 98 on for a long time in comparison to the width of the transient signal, a large resistor 96 or larger capacitor 94 or combination of both may be utilized.

In contradistinction to the indicator lamp 80 which remains on after the appearance of the first transient voltage signal, indicator lamp 98 will turn off when the signal disappears, as described hereinbefore. Hence indicator lamp 98 will flash on and off at the occurrence of each transient voltage signal. Indicator lamp 98, therefore, provides an instantaneous indication to the operator of the presence of repeated transient signals, in addition to a warning of the presence of the transient signals per se.

Simultaneous with transistors 70 and 90 being rendered conductive, a signal is fed to counter 47 wherein the presence of a signal is indicated. As described hereinbefore, the signal is also coupled to oscillator 49 which generates a series of pulses dependent upon the length of time transistor 60 is conductive which depends of course upon the length of time the transient signals appears across voltage divider 53. When point 64 of FIG. 3 approaches ground potential, this signal is coupled through conductor means 108' to the base 113 of transistor 112, rendering transistor 112 conductive. The capacitor 118 charges as described hereinbefore thereby firing unijunction transistor 120 and causing a pulse to be transmitted along conductor 128 to counter 47' as shown in FIG. 2.

Since it is obvious that many changes and modifications can be made in the above-described details without departing from the nature and spirit of the invention, it is to be understood that the invention is not limited to said details except as set forth in the appended claims.

I claim:
1. A circuit for indicating, measuring, and counting transient voltage signal characteristics in a DC power source comprising:
   a DC output circuit connected with said power source;
   a discriminator means connected to said DC output circuit for producing first, second and third output signals in response to said transient voltage;
   first indicator means connected with said discriminator and responsive to said second output signal to continuously indicate the occurrence of said transient voltage signal;
   second indicator means connected with said discriminator and responsive to said first signal to provide a temporary indication of the occurence of said transient voltage;
   means connected with said discriminator and responsive to said third output signal for measuring the width of said transient voltage signals, said means for measuring the width of said voltage transients including means responsive to said third output signal for producing a series of electrical pulses including a transistor connected to said discriminator and being conductive in response to said second output signal to charge a capacitor, a unijunction transistor connected with said capacitor and being conductive responsive to the voltage thereacross, and transistor output means connected with said unijunction transistor and conductive in response to conduction of said unijunction transistor to produce said series of electrical pulses; and
   electronic counter means connected with said discriminator and responsive to said third output signal for measuring the quantity of said transient voltage signal.

2. A circuit as set forth in claim 1 including:
   a plurality of discriminator means connected to said DC output circuit each producing first, second and third output signals in response to different predetermined values of said transient voltage; and
   switch means for selectively connecting said means for measuring the width and quantity of said transient voltage signal to said discriminator means whereby the quantity and length of said transient voltage signals can be selectively determined.

3. A circuit for indicating, measuring and counting transient voltage signal characteristics in a DC power source comprising:
   a DC output circuit connected with said power source;
   a discriminator means connected to said DC output circuit for producing first, second and third output signals in response to said transient voltage;
   first indicator means connected with said discriminator and responsive to said second output signal to continuously indicate the occurrence of said transient voltage signal;
   second indicator means connected with said discriminator and responsive to said first signal to provide a temporary indication of the occurrence of said transient voltage;
   means connected with said discriminator and responsive to said third output signal for measuring the width of said transient voltage signals, said discriminator including:
      a voltage sensing circuit connected across said DC output circuit developing a voltage which is proportional to the voltage appearing across said DC output circuit, control circuit means connected to said voltage sensing circuit for producing said first and second output signals when said transient voltage exceeds a predetermined value, and said first indicator means connected with said DC output circuit, and a gate controlled electronic device connected to said first indicator means and responsive to said second output signal to permit an uninterrupted flow of current through said first indicator means; and electronic counter means connected with said discriminator and responsive to said third output signal for measuring the quantity of said transient voltage signal.

4. The circuit as set forth in claim 3 wherein said control circuit means further comprises:

breakdown diode means coupled to said sensing circuit which will conduct when said transient voltage exceeds said predetermined level;

first electronic valve means connected to said breakdown means and conductive in response to conduction of said breakdown means; and second electronic valve means connected to said first valve means and being conductive in response to conduction of said first valve means to produce said second output signal, said second electronic valve means being connected with said gate controlled electronic device to control the conduction thereof.

5. The circuit as set forth in claim 4 wherein conductor means are connected with said first electronic valve means to provide said third output signal for said means for measuring the width of said transients voltage signals and said electronic counter means for measuring the quantity of said transient voltage signals.

6. The circuit as set forth in claim 5 wherein said gate controlled electronic device comprises a silicon controlled rectifier including anode, cathode and control electrodes:

said anode-cathode electrodes being in series circuit relation with said first indicator; and said control electrode being connected with the output circuit of said second electronic value means whereby said rectifier conducts in response to said second output signal.

7. A circuit as set forth in claim 3 further including:

said second indicator connected with said DC output circuit; and an intermittently conductive control means connected to said second indicator for controlling the flow of current to said second indicator in response to said first output signal.

8. The circuit as set forth in claim 7 wherein said discriminator means further comprises capacitor charging circuit means connected with said DC output circuit and said intermittently conductive control means for rendering said last-named means conductive for a period greater than the width of said transient voltage signal.

9. The circuit as set forth in claim 8 wherein said discriminator means further comprises third electronic valve means connected with said DC output circuit, said first valve means, said capacitor means, and said intermittently conductive control means and being conductive in response to conduction of said first valve means to momentarily discharge said capacitor means whereby said capacitor will recharge through said intermittently conductive control means to provide said first control signal therefor.

10. In combination:

a DC source connected with an output circuit;

a plurality of discriminator means each comprising voltage sensing means connected with said output circuit, an avalanche diode connected with said sensing means, each diode in each discriminator being responsive to a different predetermined transient voltage signal appearing in said output circuit;

a first transistor having a first electrode connected with said avalanche diode and conductive in response to conduction of said avalanche diode;

second and third transistors each including:

an electrode connected to a common electrode of said first transistor, an electrode connected to said output circuit and being conductive in response to conduction of said first transistor, and a capacitor connected to said output circuit and said third transistor and being alternately chargeable and dischargeable in response to conduction of said third transistor to provide a first output signal from said discriminator, said conduction of said second transistor providing a second signal from said discriminator;

indicator means connected with said discriminator comprising:

first and second indicators connected to said output circuit, a silicon controlled rectifier having its anode-cathode path connected in series with said first indicator and its control electrode connected to said second transistor and being conductive in response to said second signal, and a fourth transistor connected with said second indicator and said capacitor and being conductive in response to said first signal;

conductor means connected with said first transistor of each of said discriminator means for providing a third output signal from each of said discriminator means for providing a third output signal from each of said discriminator means;

electronic counter means for measuring the number of said transient signals appearing in said output circuit;

means for measuring the width of said transient voltage signals comprising:

means responsive to said third output signal for producing a series of electrical pulses, and electronic counter means for measuring the number of said pulses whereby the width of said transient signals may be determined; and switch means for selectively connecting said conductor means from each of said discriminator means with said electronic counter means and said means for measuring the width of said signals.

11. The invention as set forth in claim 10 wherein said capacitor connected to said output circuit and said third transistor is also connected through resistor means to the input of said fourth transistor which has its output in series with said second indicator across said output circuit for rendering said fourth transistor conductive for a period greater than the width of the transient voltage signal appearing in said output circuit.

12. The invention as set forth in claim 11 wherein said means responsive to said third output signal comprises an oscillator consisting of:

a transistor having its input connected to said discriminator and being conductive in response to said third signal to charge a capacitor connected in its output;

a unijunction transistor having its input connected with said capacitor and being conductive in response to the voltage developed across said capacitor due to said third signal to produce a series of electrical pulses in its output; and transistor output means having its input connected with the output of said unijunction transistor and conductive in response to said series of electrical pulses to produce said series of electrical pulses at the output thereof.

13. The invention as set forth in claim 12 wherein said voltage sensing means comprises a voltage divider consisting of a first resistor, potentiometer and second resistor in series across said output circuit with the output of the potentiometer coupled to said avalanche diode.

14. The invention as set forth in claim 13 wherein said indicator means is provided with protective means comprising Zener diode means in parallel circuit relation with said indicator means to limit the voltage appearing across said indicator means circuit to a predetermined value less than the breakdown potential appearing across said sensing means.

15. The invention as set forth in claim 14 wherein first indicator is operative to produce a single continuous indication in the presence of a plurality of second signals, switch means for inactivating said first indicator, and wherein said second indicator is operative to produce but one indication for each of the first signals providing individual indication of the presence of a plurality of first signals.